Oct. 23, 1962 R. L. MIGHELL 3,059,754
BALANCED CONVEYOR HOPPER
Filed May 1, 1961 7 Sheets-Sheet 1
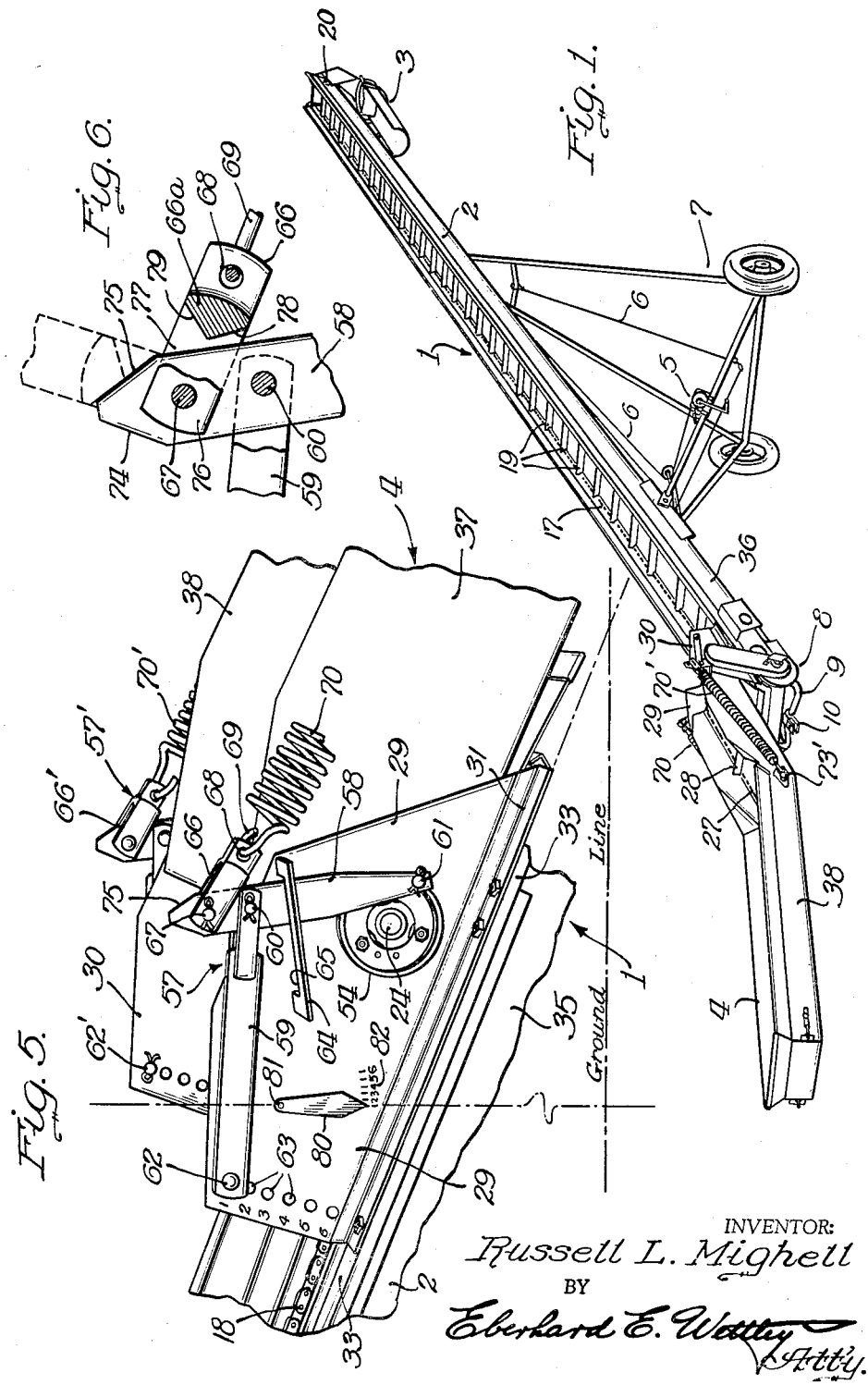
INVENTOR:
Russell L. Mighell
BY
Eberhard E. Wettey
Atty.

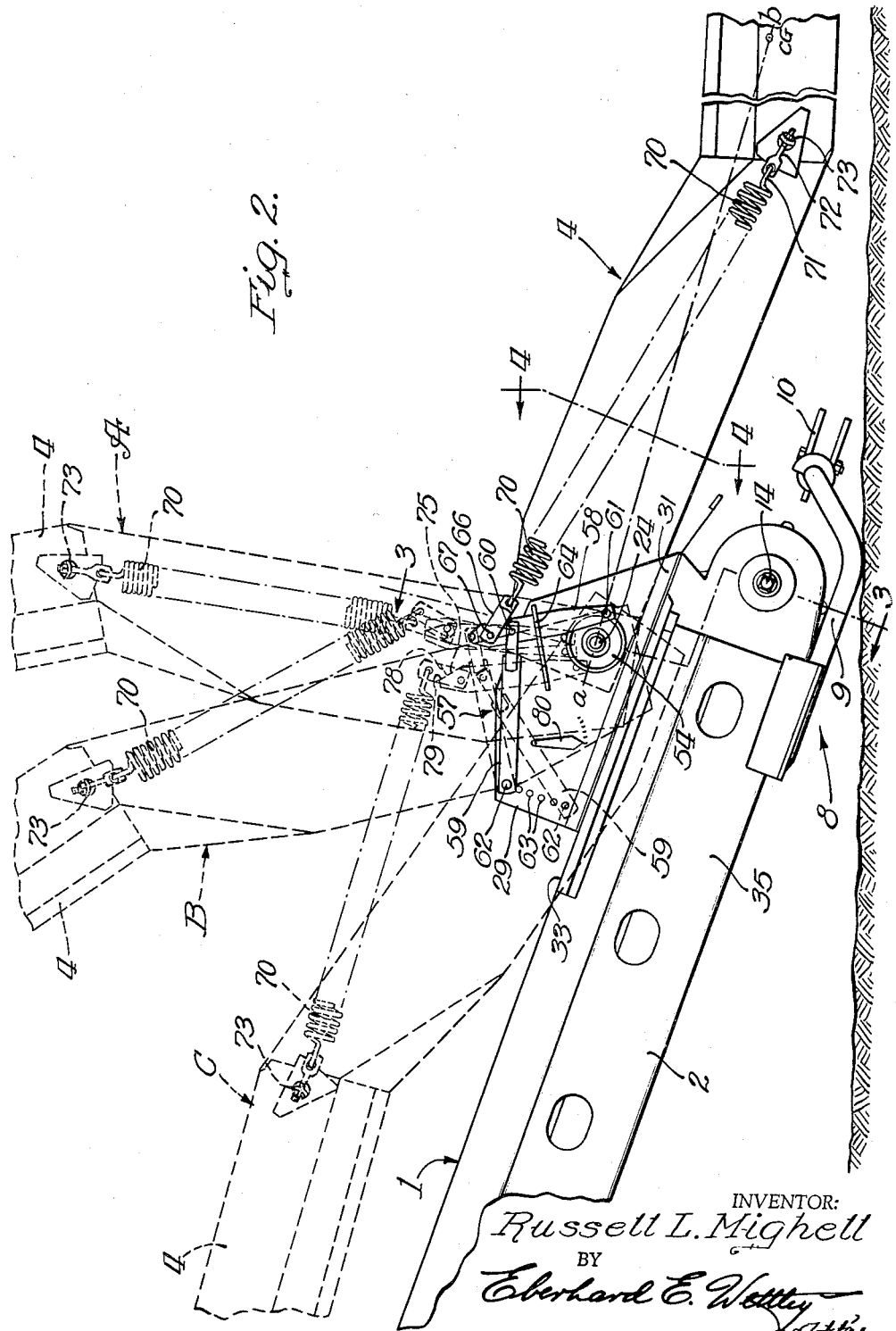

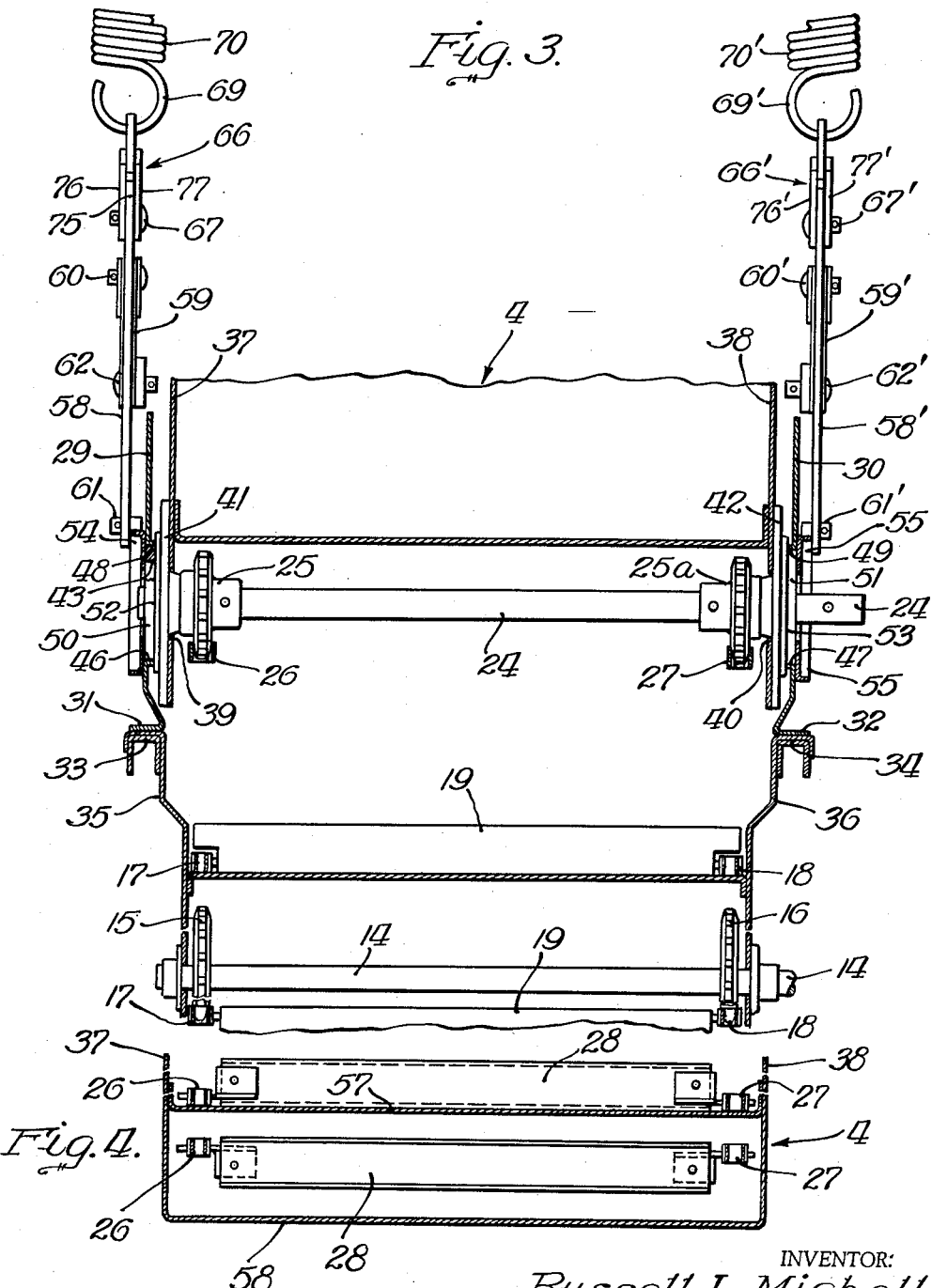

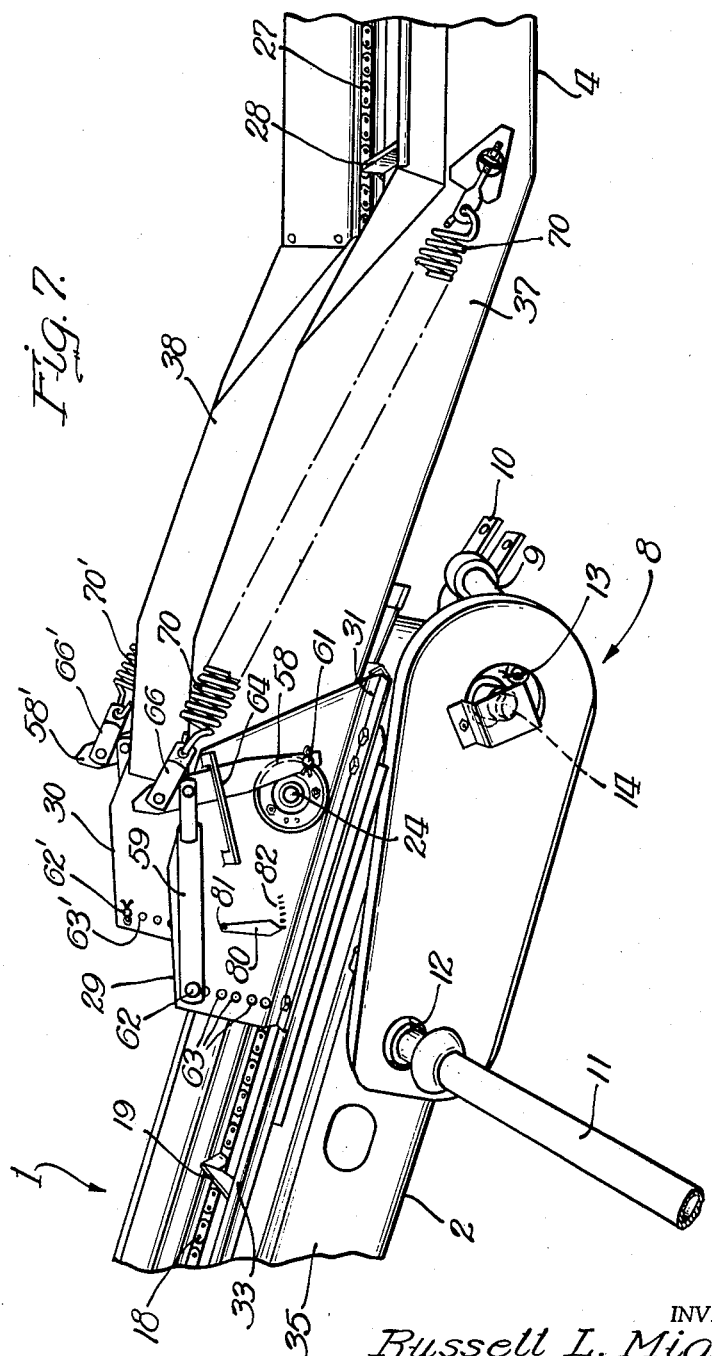

Oct. 23, 1962

R. L. MIGHELL 3,059,754

BALANCED CONVEYOR HOPPER

Filed May 1, 1961

INVENTOR:
Russell L. Mighell
BY
Eberhard E. Wente
Atty.

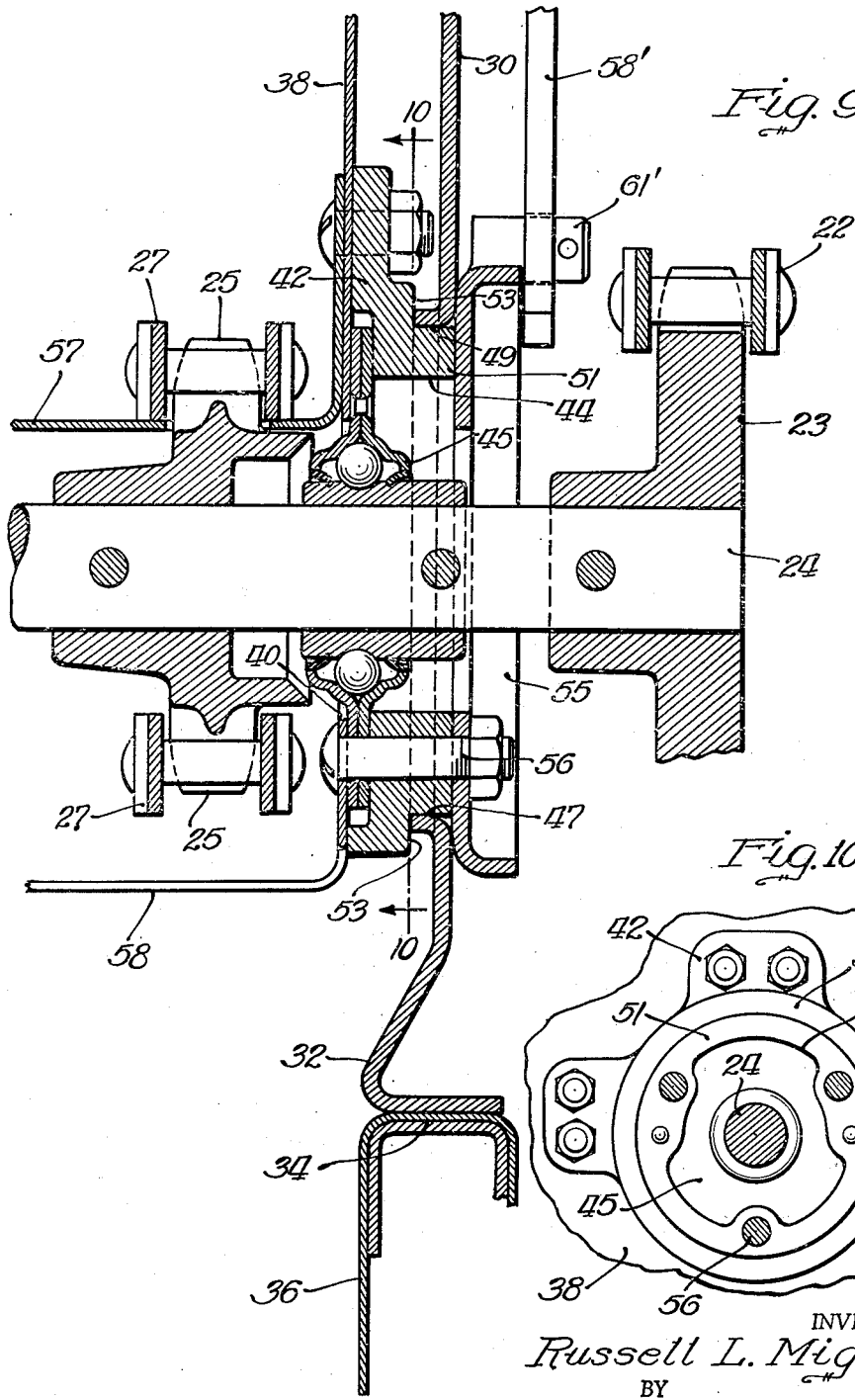

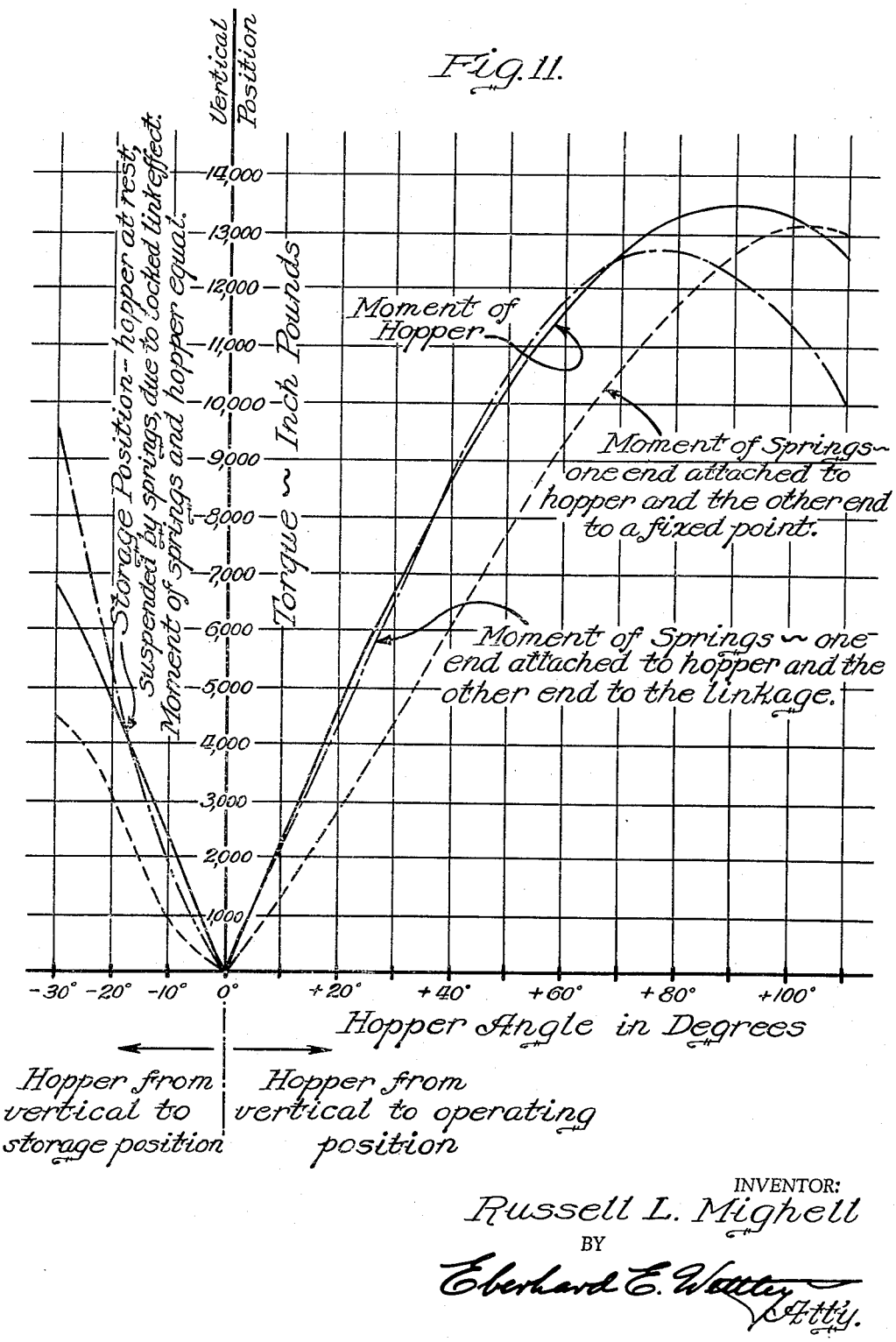

United States Patent Office 3,059,754
Patented Oct. 23, 1962

3,059,754
BALANCED CONVEYOR HOPPER
Russell L. Mighell, Kewanee, Ill., assignor to Kewanee Machinery & Conveyor Company, Kewanee, Ill., a corporation of Illinois
Filed May 1, 1961, Ser. No. 106,741
19 Claims. (Cl. 198—98)

This invention relates to a material conveyor adapted for moving materials between different levels and to a conveyor provided with a swingable hopper at its receiving end for material acceptance and delivery to the elevator portion of the conveyor.

More specifically, this invention is directed to a farm type conveyor having a tilting hopper to receive material being conveyed and to pass such material onto the conveyor, such hopper being controlled by a counterbalancing mechanism arranged to reduce manual effort to a minimum for an operator while moving such hopper into its various adjusted positions relative to the conveyor.

Tilting hoppers of conventional designs are usually provided on conveyors to be moved between a horizontal operating position to a suitable vertical non-operating position by displacement over an arc of about 107° as an average consideration. Some hoppers are held in such upright relations to the conveyor while others may be made to assume some overcenter positions beyond the 107° arc to occupy non-operative stored positions or travel positions.

It has been determined that the effort which is required to balance a tilting hopper at any point along its arc of movement is proportional to the sine of the angle to which the hopper is raised. Hence this effort resolved into a force may be plotted as a curve from zero force when the hopper is in vertical balanced position to the full load force thereof when the hopper is near to its horizontal operating position.

Hoppers of the tilting kind are rigged with coil springs for balancing efforts to overcome some of the dead weight during angular manipulation. A coil spring characteristically has a uniform force rate from zero extension to maximum extension under full load. Hence the plotting of the spring force will develop a straight line graph which does not follow the load force of the hopper as it is raised or lowered.

When an attempt is made to balance a hopper by attaching hopper balancing springs to fixed points on the conveyor, they fail to achieve perfect balance due to their straight line characteristics. However, due to the restraint of the fixed pivot at the head of the hopper, the force curve does curve slightly, but it still will only balance the hopper at one or two points, depending on the location of the fixed attaching points on the conveyor for the springs. On the other hand, if the attaching points of the springs on the conveyor could be moved to their most advantageous positions for each degree or few degrees of rise as the hopper is raised, the hopper could be made to be held in balance at any point along its arc of manipulation.

It is an object of this invention to provide a hopper balancing mechanism including a linkage means wherein the spring attachment points, which are duplicated on each side of the conveyor, are automatically shifted or moved during the raising of the hopper so that the resultant lifting forces of the springs vary so as to approximate the plotted curve of the force that is required to balance the hopper as it is raised from ground position to a vertical position or vice versa.

As previously noted above, the hopper is pivoted on the forward ground contacting end of the material elevating conveyor and the hopper, for example, swings through an arc of about 107° from an upright or vertical balanced position to a horizontal ground engaging operative position ahead of the conveyor.

The linkage means of the present invention is designed to provide leverage so that the springs will achieve a balance condition on the hopper through the upper portion of the arc (for about 80°), and then as the hopper approaches the lowered horizontal operating position, the leverage of the attaching points changes gradually through the last 27° so that the hopper will lastly stay down in its operating position as regulated by a portion of its own weight.

It is, therefore, another object of the invention to provide a counterbalancing means for a tilting hopper of a conveyor wherein shiftable or variable means is used to change the balancing spring leverage as the hopper describes a greater portion of its arc of travel and wherein the last portion of hopper travel is controlled by a spring force leverage in a manner to develop some excess force by reason of an apportionment of the weight of the hopper in a position to hold the latter on the ground and in operative relation to the conveyor.

As hereinbefore mentioned, the hoppers of conveyors of the kind generally discussed are normally stored in a vertical or upright non-operating position over the ground end of the elevator of the conveyor. It is, however, desirable and advantageous to be able to bring the hopper to rest somewhat over center toward the elevator portion of the conveyor which will place the hopper in a more convenient position of access for an operator when he is ready to swing the hopper into the down and operating position.

It is a further object to provide a spring connected link means that will function in a manner to allow the hopper to pass through a low load phase vertical position toward a position of rest wherein the link means act to increase the spring leverage after the hopper moves over center and which link means is capable of bringing the hopper to a stop gradually and gently without shock as the springs absorb the load energy of the hopper movement at a given angular relation above the run of the conveyor.

Conveyors of this kind are adjustable to different angular positions to change the inclination of the elevator in relation to the ground to place the discharge end of the conveyor at a selected elevation. This causes a limited angular inclination range of operation for the conveyor which will change the angular position of the conveyor in relation to the surface of the ground. This change of conveyor angularity also causes the hopper to swing through an arc of operation that varies in relation to a vertical reference plane intersecting the pivotal axis of the hopper.

As a further object, therefore, the hopper balancing mechanism has been constructed to include an adjustable regulation so as to beneficially accommodate itself to each condition of hopper swing for the various angular conveyor positions of the elevator in serving different discharge elevations. This regulation and adjustment is incorporated into the link means employed and includes a range of variations that will adjust for the change in the position of the elevator between approximately 17° to 45°, the normal range conventionally acceptable for most conditions of operation.

Other objects and advantages relating to the balanced conveyor hopper of the present design and invention shall hereinafter appear in or become apparent from the following detailed description having reference to the accompanying drawings which form a part of this specification.

In the drawings:

FIG. 1 is a diagrammatic perspective view of a farm conveyor incorporating the newly devised mechanisms of the present invention that serve to balance the hopper structure of the conveying elevator;

FIG. 2 is a fragmentary side elevational view of the left side (viewed from the hopper end) of the ground end of the conveyor with the hopper occupying its lowered position for operatively receiving materials for feeding the elevator section of the conveyor;

FIG. 3 is a transverse vertical cross sectional view taken through the conveyor structure substantially along the plane of the line 3—3 in FIG. 2;

FIG. 4 is another transverse vertical cross sectional view taken through the hopper section of the conveyor and substantially along the plane of the line 4—4 in FIG. 2;

FIG. 5 is an enlarged side elevational view of a fragmentary portion of the left side of the conveyor to better illustrate some of the details of the mechanisms of this invention;

FIG. 6 is a fragmentary detail view partially in section to show some details of the link means of the mechanism that balances the hopper;

FIG. 7 is a perspective view of the left side portion of the ground end of the conveyor and its attached hopper;

FIG. 9 is an enlarged fragmentary vertical cross sectional view of the pivotal arrangement at one side of the hopper and conveyor that show structural details of the right hand portion of FIG. 3;

FIG. 10 is a detailed face view of the bearing means as the same appears when viewed substantially along the plane of the line 10—10 in FIG. 9;

FIG. 11 is a graph diagrammatically showing certain of the relationships described and to be further explained in support of the efficiency and beneficial operation of the hopper balancing mechanism herein disclosed.

Figure 8:
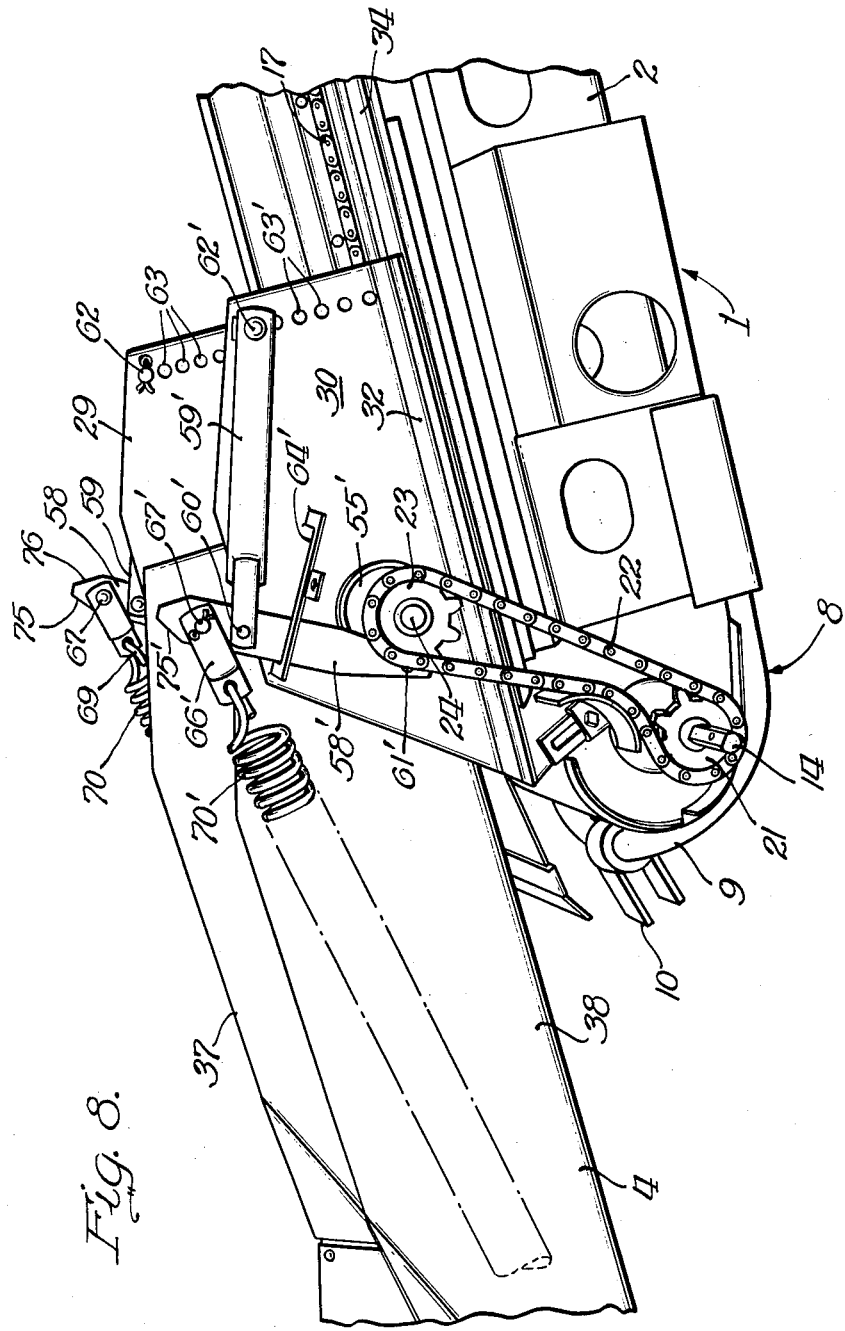
FIG. 8 is another perspective view of the same general portion of the hopper end of the conveyor, but as viewed from the right hand side thereof.

The exemplary conveyor 1 best shown in FIG. 1 comprises an elevator portion 2, delivery spout 3, material receiving hopper 4 and suitable conveyor elevating mechanism such as the crank means 5 with cables 6 all connected to raise and lower the elevator portion 2 on the wheeled supporting frame 7 provided for adjusting and changing the angular elevation of the conveyor with respect to the ground.

As best illustrated in FIGS. 2, 7 and 8, the front or lower ground end of the conveyor shown at 8 rests on the ground on the hitch rods 9 that carry the towing bracket 10 which is used to haul the conveyor when the hopper 4 is swung over the elevator portion 2 in a non-use position.

The elevating or conveying mechanisms comprise suitable chain drives located in the conveyor chute and in the hopper, the two chain drives having a common external power drive and connected chain drives to synchronize the material advance in the chutes. The external drive may be had from a suitable power source such as a tractor, engine, or the like. In FIG. 7, a drive shaft 11 connects with a suitable sprocket shaft 12 that transmits the drive by suitable sprocket and chain to a sprocket 13 secured to the main forward or lower drive shaft 14 of the conveyor. Shaft 14 carries suitable sprockets 15 and 16 to actuate spaced chains 17 and 18 supplied with connecting slats 19 that provide the material elevating flight structure of the conveyor, traveling over a suitable upper sprocket carrying shaft 20.

As shown in FIG. 8, shaft 14 is equipped with a sprocket 21 on the conveyor on the right side (looking at the conveyor from the hopper end) to drive a connecting chain 22 that is trained over a sprocket 23 secured to the hopper drive shaft 24. Spaced chain drive sprockets 25 and 25a are secured to shaft 24 as seen in FIG. 3, and such sprockets propel chains 26 and 27 that carry slats 28 crosswise of the hopper for longitudinal movement through the hopper chute to feed the conveyor chain flight. As will be further described, the shaft 24, while providing an essential part of the conveying system, this same shaft 24 also furnishes the pivotal support of the conveyor attached end of the hopper 4 which is best evident from inspection of FIGS. 2, 3 and 9.

The hopper support and pivotal structure best appearing in FIGS. 2, 3, 5, 7, 8 and 9, comprises a pair of side plates 29 and 30 that are provided with base angles 31 and 32 that seat and are attached to the reinforced top rails 33 and 34 of the conveyor sides 35 and 36.

The hopper sides 37 and 38 each have holes 39 and 40 coaxially positioned with respect to shaft 24 and flanged bearings 41 and 42 are secured to the sides 37 and 38, the bearings being provided with central openings 43 and 44 that also coaxially surround shaft 24 as best illustrated in FIGS. 3 and 9. Ball bearing units such as 45 are securely oriented and mounted between the bearings 41 and 42 and the adjacent hopper sides 37 and 38 in the manner shown in FIGS. 3 and 9.

The mounting side plates 29 and 30 are each provided with apertures 46 and 47 located coaxially with shaft 24 and have annular bearing flanges 48 and 49 that rotatively receive the shouldered bearing bosses 50 and 51 formed upon the flanged bearings 41 and 42.

The flanged bearings 41 and 42 are provided with radially positioned vertical faces 52 and 53 to ride against the edges of the bearing flanges 48 and 49 for lateral stability of the hopper pivotal and drive system described. These bearing assemblies are each further augmented by cup shaped retention washers 54 and 55 that are secured to the bearing bosses 50 and 51 by bolts such as 56 that also serve to secure the ball bearing units 45 and the flanged bearings 41 and 42 to the hopper sides 37 and 38.

The hopper chains 26 and 27 have their two flights (as seen in FIG. 4) running over the upper auxiliary cross floor 57 for advancing material and returning therebelow over the lower floor 58 spanning the space between the hopper sides 37 and 38, the elevation of the hopper chain drive discharge end being above the elevation of the conveyor receiving chain drive location at the ground end of the conveyor to drop material onto the conveyor chain flight.

From the foregoing description, it will be understood that the hopper as a unit can be bodily swung about shaft 24 on the two bearing assemblies defined, which will provide a structure that will allow an operator to move the hopper between suitable stored and operative positions. The stored position is normally upright or over the conveyor which is also the transport position, while the operative material receiving position of the hopper is down upon the ground ahead of the conveyor and in a generally horizontal relation.

Obviously with a hopper which, for example, weighs 215 pounds spread out over the long length of the hopper, it is difficult to raise this unit and also hard to handle when reversing this operation. The invention herein disclosed is directed to a counterbalancing arrangement for the hopper that will permit an operator to swing the hopper quite freely and with a minimum of physical effort. The counterbalancing means is duplicated at each side of the conveyor-hopper union location and generally, except for the individual connections with shaft 24, the counterbalancing means are each solely carried on the sides of the hopper and made operational from these locations.

One side arrangement of the counterbalancing mechanism will be described by reference numbers that will be duplicated but primed at the other side of the hopper, thus indicating like parts in a simple but differentiating manner on opposite sides of the conveyor.

As best illustrated in FIGS. 2, 3 and 5, a counterbalancing link means 57 comprises a pair of toggle links 58 and 59 pivotally joined by a pin 60, with link 58 riding on a crank or pivot pin as a stub shaft 61 welded or otherwise fastened to the rim portion of the left retention washer 54. The second link 59 has a pivot pin 62 that is lodged into and held in one of the spaced openings 63 formed in the side plate 29 on the conveyor. An intermediate guide bar 64 is secured to the face of the side plate 29 to provide an elongated slot 65 for the link 58 to stabilize the latter adjacent the face portion of plate 29 thus keeping the link parts in their plane of operation at all times during the manipulation of the hopper about its pivotal supporting shaft 24.

The link 58, which may also be referred to as a spring arm, carries a short spring link 66 on a pin 67, the link 66 having an aperture 68 to accept the hook end 69 of the counterbalancing spring 70. Spring 70 flanks hopper side 37, and as seen in FIG. 2 is provided with a second hook end 71 to hook into the aperture of an eyebolt 72 that is secured to an anchor shaft or tube 73 held in the hopper proper.

The upper end of the link or spring arm 58 is made with tapered edges at 74 and 75 to provide a symmetrical link for use on either side of the conveyor or with either face toward the hopper. However, as shown, one tapered edge 75 does function in a definite manner in coaction with link 66. FIG. 6 shows link 66 in section with legs 76 and 77 made to straddle spring arm 58, the link 66 having a dual tapered connecting head 66a to provide surfaces 78 and 79, only one of which is actively functional, the other being for symmetry. When the hopper 4 is swung upwardly to a predetermined vertical position, the surface 79 engages the tapered edge 75 of link 58 and both the links will then act as a single link under the action of spring 70 which now acts in a direction to hold the stop surfaces together when the hopper is beyond the predetermined vertical position above the conveyor. This selected position is approximately coincident with the position B of the hopper as illustrated in broken lines in FIG. 2 of the drawings.

The link means 57 is made adjustable in operation to accommodate the most efficient performance of counterbalancing in relation to the angle of inclination of the elevator 2 of the conveyor 1. This regulation or adjustment is made possible by shifting pin 62 into different ones of the holes 63 on the side plate 29 shown in FIG. 5. Obviously, both pins 62 and 62' are shifted for each particular setting.

To determine the proper and correct positions of pins 62 and 62' in relation to the elevator inclination, an indicator is provided in the form of a free hanging pointer 80 pivotally suspended from a pin 81 secured to the face of the side plate 29 as best seen in FIG. 5. The pointer acts as a plumb bob and indicia is provided at 82 in the form of graduations from 1 to 6 for elevator inclinations between 17° and 45°, the setting of the pointer establishing which of the holes 63, also marked correspondingly from 1 to 6, is to be used for reception of the pin 62 to hold the end of link 59 in the appropriate pivotal relation on plate 29. Pin 62' is placed in the aligned hole 63' on plate 30, the latter being marked 1 to 6 for the corresponding holes.

As stated in the objects, the link means and spring arrangement are devised to aid in the swinging of the hopper from the ground to a stored position and vice versa. The link means is controlled in operation by being directly responsive to the turning of the bearing assemblies which follow the angular motion of the hopper as it rotates about the axis of shaft 24. The effective moment of pull of the springs is varied in relation to the pivotal axis of the hopper by a displacement of the points of attachment of the springs at the pivotally supported end of the hopper, the springs remaining attached to the hopper sides at fixed locations in their outboard positions relative to the pivotal axis of said hopper.

The moments of the spring system are varied automatically to compensate for the changing torque of the hopper as it assumes different angularities between a normal vertical no torque position and its operative ground engaging position. FIG. 11 demonstrates the various values of hopper torque in inch pounds plotted against the hopper angle in degrees. The zero line is vertically shown and represents the no torque position of the hopper wherein its center of gravity is disposed vertically over its pivotal axis concident with the axis of shaft 24, in which position springs 70 and 70' are actually fully retracted and loosely constituted between their hook ends 69 and 71, although not loose enough to cause displacement. This zero position is depicted by the broken line position A shown in FIG. 2 of the drawings.

The above relationship is indicated by the legends in FIG. 11, the right portion of the graph covering the action of counterbalancing of the hopper from zero upright position A to the ground touching position shown in full lines in FIG. 2. The left portion of the graph shows the over center action of the hopper to a position of storage, which is position B in FIG. 2 with link 59 having pin 62 in the top hole 63. Position B, as noted in the graph, is established under the locked link condition, links 58 and 66 being as shown in broken lines in FIG. 6, and the balanced stop position of the hopper coming about by a balance of the moment of the springs and the hopper, the moments becoming equal at the point indicated on the graph.

By moving link 59 with its pin 62 in hole number 6 on plate 29, the hopper can be brought into a transportable position as illustrated in broken lines at C in FIG. 2, thus reducing the overall height of the conveyor at its head end while traveling. This shift of pin 62 holds the hopper in balance in the relation shown.

In the graph, the broken dotted line is shown to demonstrate what takes place in structures where the springs connect with fixed points on the hopper and with fixed points on the conveyor structure. In contrast, the dot and dash line on the graph illustrates how the linkage means of the present invention develops variable moments that substantially follow the full line moment action of the hopper per se.

The deviation between the dot and dash line and the hopper moment line at the top of the graph at the right is used to advantage in providing the hopper with some excess torque value to help in keeping the hopper against the ground in operative loading position which is desirable. In FIG. 2, the pull of spring 70 is from a position below line a—b at the outer end of the hopper to a position above the line a—b at the pivotal end of the hopper, with line a—b being drawn through the pivotal axis of shaft 24 and the center of gravity of the hopper. This is the relationship shown at the upper right hand side of the graph in FIG. 11.

And as previously mentioned, the links 58 and 66 are provided with the locking members to develop a longer rigid link for over center leverage to coact with the spring action to cause quicker hopper load retaining characteristics to store the hopper in position B just beyond the no torque vertical dead center posititon shown at A, as seen in FIG. 2.

Thus the invention provides a variable linkage controlled spring moment condition that forcewise simulates but counteracts the moment of the hopper about a fixed pivotal mounting on the conveyor providing a simple, feasible and efficient counterbalancing arrangement. In effect, the linkage means responsive to and controlled by hopper movement, actually establishes hopper weightlessness under its operation between its various maximum positions, ranging from stored to operative positions. The hopper in the constructions illustrated weighs about 215 pounds and its full length is about 10 to 11 feet from the pivotal shaft 24 to the outer terminal ground end thereof.

The changeable leverage of the linkage spring arm 58 may be best observed in FIG. 2 wherein the full line position of this link to the spring 70 attaching point is at a minimum, while the spring expansion is at its maximum. The cup washer 54 on the hopper is turned to its greatest clockwise position bringing the pin 61 into the lowered position shown in FIGS. 2 and 5. As the hopper is raised, cup washer 54 rotates in a counterclockwise manner to extend the effective leverage of link 58 to gradually cause pin 67 to move with its spring link 66 further away from the axis of shaft 24 and the spring 70 begins to retract in length under the automatic change in the point of attachment of such spring with the linkage considered with respect to the axis of shaft 24 which remains unchanged.

When the hopper passes through position A in FIG. 2, the links 58 and 66 become locked with the contact of surface 79 with edge 75 and the spring 70 now acts on the outer end of the combined link 58 and 66 to create a moment of retarding force of a value to let the hopper come to rest in the position B in FIG. 2. The same action unfolds itself under reverse conditions to hold the hopper in balance on its way to the ground.

The foregoing description has been directed to one specific embodiment of the invention illustrated in the drawings. However, certain changes in the exact design of the elements shown or in the exact combinations presented are contemplated and the figures given by way of example may also be varied without departure from the fundamental concept of this invention. The contemplated modifications shall, therefore, be permissible in latitude to the extent of the breadth and scope of the language expressed in the hereinafter claimed subject matter directed to the balanced conveyor hopper of this invention.

What I claim is:

1. In a conveyor, an elevator unit, a hopper unit, pivotal means to support said hopper unit for swinging movement relative to said elevator unit about one axis, and counterbalancing means to hold said hopper unit in balance during the raising and lowering thereof about said pivotal means comprising a link mechanism swingably connected with one of said units and having operative swingable connection with said pivotal means on another axis offset with respect to said one axis, spring means connected with said hopper unit and with a given part of said link mechanism, said hopper unit being connected to cause rotation of said pivotal means during the swinging movement of the hopper unit, said link mechanism providing apparatus to actuate said part thereof in a predetermined relation with respect to the axis of the pivotal means to automatically vary the effective pull of said spring means through the link mechanism to keep said hopper unit in balance during the different angular positions assumed thereby during its swing.

2. A counterbalancing apparatus for a tilting hopper on a conveyor comprising, in combination, a hopper chute, a conveyor chute, pivotal means connecting said chutes to permit said hopper chute to swing bodily between operative and inoperative positions in relation to said conveyor chute about a given axis, a link mechanism on said conveyor chute, and a spring connected between said hopper chute and said link mechanism to provide the counterbalancing action for said hopper chute, said link mechanism having an operative fulcrumed connection with said hopper chute upon an axis radially spaced from said given hopper chute axis of rotation of said hopper chute upon said conveyor chute, whereby said link mechanism is actuated in response to the tilting motion of said hopper chute, said link mechanism being constructed and arranged to regulate the effective line of pull of the spring in relation to the hopper chute axis on the conveyor chute to balance the hopper chute as it assumes different angular positions with respect to the conveyor chute.

3. In combination, in a conveyor, an elevator, a hopper for said elevator, pivotal means on said elevator supporting said hopper and having a rotatable element connected with said hopper to follow the motion thereof while tilting between operative and inoperative positions about said pivotal means, and counterbalancing mechanism for said hopper comprising an articulate linkage having one end pivotally mounted on said elevator and its other end pivotally connected with said rotatable element of said pivotal means, and spring means connected between at least one of the members of said linkage and an outboard portion of said hopper, tilting of said hopper providing rotary actuation of said rotatable element of said pivotal means to operate the articulate linkage to automatically cause the linkage to change the effective line of pull of said spring means in relation to the axis of swing of said hopper in a manner to keep said hopper in balance with said spring means.

4. In combination, in a conveyor, an elevator, a hopper for said elevator, pivotal means on said elevator to support said hopper for tilting between operative and inoperative positions, and counterbalancing mechanism for said hopper comprising an articulate linkage having one end pivotally mounted on said elevator and its other end connected with said pivotal means, and spring means connected between at least one of the members of said linkage and an outboard portion of said hopper, tilting of said hopper providing rotary actuation of said pivotal means to operate the articulate linkage to automatically cause the linkage to change the effective line of pull of said spring means in relation to the axis of swing of said hopper in a manner to keep said hopper in balance with said spring means, said elevator including means to adjust the inclination of said elevator in relation to the ground, such adjustment acting to change the limits of the angular swing of said hopper in relation to the elevator, said elevator being provided with multiple attachment means to selectively receive said one end of the articulate linkage in different positions, said attachment means establishing a range of connections that each serve to adjust the operation of said linkage for counterbalancing the hopper in accordance with the particular inclination of said elevator.

5. In the combination of claim 4, with the addition of cooperative plumb bob mechanism on said elevator having indicia means to indicate to which of said attachment means said one end of the articulate linkage should connect to serve the hopper for the particular inclination occupied by said elevator.

6. A conveyor comprising an elevator, a hopper to supply material to said elevator, a fulcrum shaft on said elevator to pivotally support the hopper thereon for tilting from an inoperative position above said elevator to an operative ground engaging position beyond the ground end of said elevator, and counterbalancing mechanism to keep said hopper in balance while moving between the positions noted, said mechanism comprising a pair of pivotally joined links, a bearing unit connected with said hopper and rockably disposed in relation to said fulcrum shaft, said links being pivotally connected with a fixed portion of said elevator and with said rockable bearing unit, and spring means having one end attached with the joined links intermediate their connections with said elevator and the bearing unit, the other end of said spring means being connected with the hopper, rotation of said bearing unit by said hopper about said fulcrum shaft causing said joined links to change the effective line of pull of the connected spring means in relation to the fulcrum shaft to compensate for the torque load changes in proportion to the angular hopper positions when said hopper is manipulated between operative and inoperative positions.

7. In a conveyor as in claim 6, wherein a separate spring arm is interposed between the spring means and the pivotally joined links and pivoted on one of said links, and cooperative lock means are provided on said spring arm and on said one link, said cooperative lock means being automatically rendered effective by the spring means as the hopper reaches a predetermined upright position, continued motion of said hopper beyond said position being arrested by the leverage of said locked link and arm on said spring means.

8. In a conveyor as in claim 7, wherein at least one of the joined links and said elevator include adjustable securing mechanism disposed remote from the juncture of said link with its companion link whereby to change the final angle of arrest of the hopper in relation to the elevator.

9. In a conveyor having an elevator and a swingable hopper at its ground end, a counterbalancing mechanism to balance the hopper comprising a shaft to pivotally support the hopper on said elevator, crank means secured to said shaft, link means on said elevator having connection with said crank means, and spring means connected with said link means and with a remote point on said hopper, said link means establishing a lever structure to coact with the spring means to develop a moment of force to oppose the torque force of the hopper about said shaft, said hopper having connection with said crank means to rotate the same during hopper motion, and said link means functioning to vary the leverage thereof in conjunction with said spring means in a predetermined proportion to the opposing torque force of the hopper while the latter is being angularly swung about its supporting shaft.

10. In a conveyor combination as in claim 9, wherein said link means includes a pivotal connection joined with said elevator at a selected location to cause said spring means to balance said hopper over one range of bodily swing, said pivotal connection being adjustable on said elevator to cause said spring means to balance said hopper over a different range of bodily swing.

11. In the conveyor set forth and defined in claim 10, wherein said elevator is adjustable as to inclination with the ground, and said adjustable pivotal connection of the link means with said elevator provides a different moment pattern for the hopper in respect to each different inclination of the elevator, the addition of automatic cooperative means to inform an operator as to where the pivotal connection of the link means is to be made with the elevator to balance the hopper for that specific inclination of the elevator.

12. A conveyor comprising an elevator, a hopper, and pivotal means to mount said hopper on the elevator for swinging movement between a stored inoperative position and a lowered ground contacting operative position, resilient means connected at one end with said hopper to balance the same, and operative shiftable mechanism to receive the other end of said resilient means, said shiftable mechanism being connected with said hopper and being responsive to the swinging action of said hopper to change the position of the other attached end of said resilient means in relation to the pivotal means of said hopper and to vary the resultant moment force of said resilient means on said hopper in a predetermined relation to the torque force of said hopper during its movement about said pivotal means.

13. A conveyor as in claim 12, wherein said resilient means are spring members, said operative mechanism comprise toggle links having one end thereof pivotally mounted in a fixed location on said elevator, the other of said links being connected with a hopper part, said hopper part being adapted to actuate the toggle links in a predetermined relation to vary the moment force of the spring members on said hopper in a predetermined value with respect to the torque force exerted by said hopper in its motion about its pivotal mounting means.

14. A conveyor as in claim 13, wherein said hopper part is a crank element having a crank pin connection with the other of said links, said crank member being freely fulcrumed upon the pivotal means mounting the hopper on the elevator.

15. In the combination of claim 14 wherein said crank element provides a bearing unit for the hopper to freely and swingably support said hopper upon said pivotal means of the elevator.

16. In an apparatus, in combination, cooperative connected mechanisms comprising a first stationary section, a second swingable section, a shaft on said stationary section to pivotally support said second swingable section for arcuate displacement between an operative extended position ahead of said stationary section and an inoperative stored position overlying said stationary section, and counterbalancing structure coacting between said relatively movable sections to react to the weight resistance of said swingable second section during the arcuate transposition of said second section between its operative and stored positions, said counterbalancing structure comprising a shiftable guided link, a spring connected at a given point with said link and connected with said second section at a point remote from the axis of the pivotal supporting shaft on said first section, a rotary device having connection with said second section and having a pin thereon movable in a predetermined path about the axis of said shaft connecting said sections, said shiftable guided link being connected with said pin of said rotary device whereby arcuate displacement of said second section causes said link to move the point of connection of said spring with said link into different radial distances with respect to the axis of swing of said second section to establish a variable effective moment arm for said spring and to automatically balance the second section at the various respective positions of swing assumed thereby.

17. In the combination of claim 16, with the addition of an auxiliary swingable link interposed between the spring and said given connecting point on said shiftable guided link, said auxiliary link and said guided link having cooperative stop means thereon to lock said links together when said second section moves beyond a given angular position in its arcuate travel to further change the effective spring pull on said second section beyond said angular locking position.

18. A conveyor comprising an elevator, a hopper and pivotal bearing structure to mount said hopper on said elevator for swinging movement between a stored inoperative position and a lowered operative ground engaging position, said pivotal bearing structure comprising a conveyor chain shaft, bearings for said shaft, and mounting units to attach said bearings to said hopper, said elevator providing apertured plates adjacent opposite sides of said hopper with said mounting units each journaled in the plate apertures and providing a rotary disc member outwardly beyond the outer side of the adjacent plate, and counterbalancing means for said hopper each providing mechanism associated with one bearing means and with one of the elevator plates and comprising a shiftable lever, a pin on said disc member pivotally connected with said lever, cooperative guide means carried on said plate and coacting with said lever to guide the free end thereof in a predetermined path when said disc member is rotated by the motion of said hopper, and a spring connected between the free end of said lever and a remote point on said hopper to counterbalance said hopper, the resultant active force of said counterbalancing means on said hopper being varied according to the angular positions assumed by the hopper through the change of the position of the spring connection by the motion of said lever in relation to the pivotal axis of the elevator shaft with said force being directly responsive to the position of the lever as determined by the pin on the hopper rotated disc member.

19. In the combination of claim 18, wherein said elevator includes means to adjust the inclination thereof in relation to the ground level, and one of said guide means comprises a link pivotally connected with said lever and having its other free end attached for pivotal movement on the adjacent side plate, said plate and said free end of said link having selective attachment means whereby to change the attached location of said link on said plate to compensate for the variation of the elevator inclination in guiding said lever to attain the proper counterbalancing force to balance the hopper for the specific inclination of said elevator.

References Cited in the file of this patent

UNITED STATES PATENTS

| | | |
|---|---|---|
| 474,010 | Grube | May 3, 1892 |
| 1,090,670 | Zimmerman | Mar. 17, 1914 |